Figure 1:
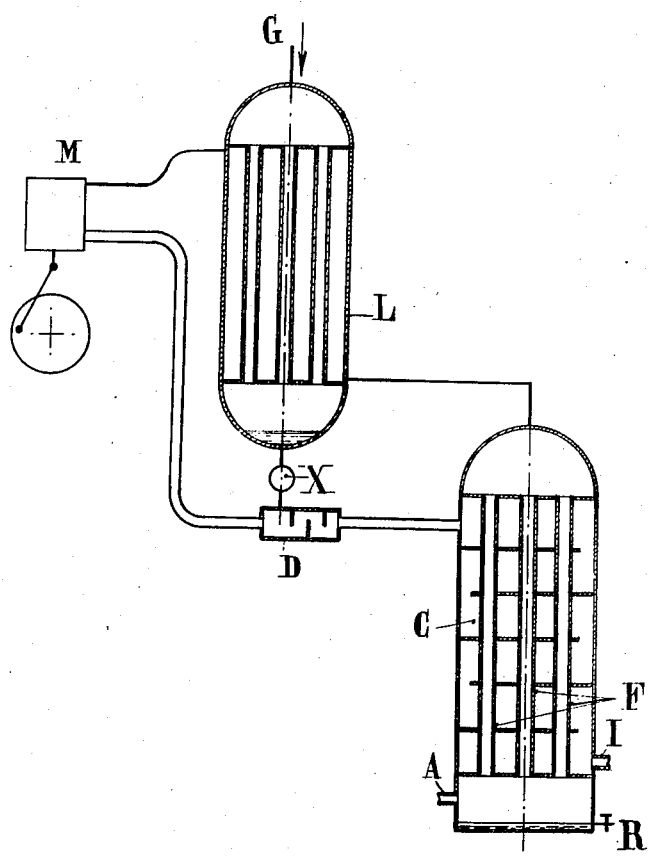

Jan. 12, 1932.  G. CLAUDE ET AL  1,840,833
SEPARATION OF GASEOUS MIXTURES
Filed July 16, 1925   3 Sheets-Sheet 1

INVENTORS:
Georges Claude
and Jean Le Rouge
By
ATTORNEY

Patented Jan. 12, 1932

1,840,833

UNITED STATES PATENT OFFICE

GEORGES CLAUDE, OF PARIS, AND JEAN LE ROUGE, OF BOULOGNE-SUR-SEINE, FRANCE, ASSIGNORS TO LA SOCIÉTÉ L'AIR LIQUIDE, SOCIÉTÉ ANONYME POUR L'ETUDE ET L'EXPLOITATION DES PROCÉDÉS GEORGES CLAUDE SIEGE SOCIAL: PARIS, FRANCE

SEPARATION OF GASEOUS MIXTURES

Application filed July 16, 1925, Serial No. 44,007, and in France August 5, 1924.

This invention relates to the purification of hydrogen or other gas liquefying at low temperature, and has special reference to the removal of the residual carbon-monoxide and of any residual methane that may still be present in the hydrogen produced by the partial liquefaction of water gas, ordinary illuminating gas, coke oven gas and the like.

In effecting the separation by partial liquefaction of the constituents of a gaseous mixture containing hydrogen, the said compressed gaseous mixture is circulated in indirect contact with the liquids formed by the more condensable constituents, whereby the boiling of the said liquids and the simultaneous liquefaction of the aforesaid more condensable constituents in the gaseous mixture are effected. Even after treatment in this manner however the residual unliquefied gas is not always freed from carbon-monoxide, and, it may be, methane as wholly as may be desired, and it is then necessary afterwards to subject the hydrogen obtained to an additional purification by the action of a still lower temperature.

The object of the present invention is to provide a means for obtaining this very low temperature that is required for effecting the purification of hydrogen or other gas liquefying at low temperature from residual amounts of other gases present in the original gaseous mixture from which the hydrogen or other gas to be purified is obtained by a partial liquefaction treatment.

According to the present invention in processes for the separation of hydrogen by partial liquefaction of mixtures of gases containing the same, such for example as water gas, ordinary illuminating gas, coke oven gas and the like, a method for completing the removal from the hydrogen of carbon-monoxide and any methane that may still be present so as to improve the purity of the gas obtained by circulating cold gas in indirect contact with the hydrogen-containing mixture to be purified, consists in introducing and vaporizing in the cold gas liquid nitrogen so as to lower the temperature. To this end when the cold gas is hydrogen manufactured by the process, it is expanded and liquid nitrogen is introduced into the expanded hydrogen and allowed to vaporize therein so as to lower the temperature, and thereafter the very cold mixture thus obtained is circulated around the tubular system in which the final condensation of the gases accompanying the hydrogen is effected under pressure.

The method according to the present invention is also applicable to the purification of gases other than hydrogen which liquefy at low temperatures so as to remove therefrom one or more gases that are more easily liquefiable; an appropriate liquefied gas, which may be other than liquid nitrogen, according to the circumstances of the case, being used in effecting the purification in a similar manner to that previously referred to, and described in more detail in the following description, for the purification of hydrogen by means of liquid nitrogen.

In order that the invention may be clearly understood, the same will now be described more fully with reference to the accompanying drawings which show in diagrammatic section three different forms of apparatus suitable for carrying out the invention.

Referring to Fig. 1, the compressed gaseous mixture to be treated, after having previously been subjected to partial liquefaction in a suitable apparatus (not shown) so as to free it from almost its entire content of methane and carbon-monoxide, is admitted through an inlet A at the bottom of the partial liquefaction apparatus C whence it passes through the nest of tubes F arranged therein, the liquid produced in the said tubes F being withdrawn through the valve R.

The hydrogen which passes out from the tubes F of the partial liquefaction apparatus C and which contains small amounts of carbon-monoxide and, it may be, some methane, is expanded with production of external work in the expansion machine M, the expansion being effected down to a pressure preferably about that of the atmosphere. Before circulating around the exterior of the tubes F of the apparatus C, the expanded hydrogen is passed through a container D provided with baffles into which liquid nitrogen obtained in the manner hereinafter described is introduced by means of the valve X. The liquid nitrogen, being discharged into an atmosphere rich in hydrogen and poor in nitrogen, itself acquires and efficiently maintains the very low temperature corresponding to its partial pressure which is much lower than atmospheric pressure.

The very cold mixture thus obtained circulates outside the tubes F in the compartment C and, owing to its very low temperature, brings about the condensation of the carbon-monoxide, and also of any methane, still present with the hydrogen inside the tubes F. After circulating around the tubes F the gases leave the compartment C by the outlet I and, after having been partially reheated if need be in liquefiers at the expense of the gaseous mixture treated, are admitted to the temperature exchangers—these latter are not shown in the drawings.

Under these conditions the very low temperature required for the purification of the hydrogen has no longer to be produced by means of the expansion machine itself, which can thus be supplied with hydrogen which is relatively only slightly cold, whereby the efficiency of the expansion in respect of the amount of cooling obtained is considerably improved. With this object in view the compressed hydrogen, on issuing from the tubes F, can be reheated, for example by circulating it through the liquefier L, and so at the same time bringing about the liquefaction of the nitrogen (which serves as the purifying agent), which is introduced in the cold condition and under pressure through the inlet G of the liquefier.

Of course the reheating of the hydrogen, prior to its expansion, can be increased to a further extent in the usual manner by circulating it in indirect contact with the whole or a part of the compressed gaseous mixture to be treated.

If moreover the purification of the hydrogen from carbon-monoxide and methane is not completed by the method previously described, such purification can be completed by circulating the liquid nitrogen introduced into the collector D in the opposite direction to but in contact with the expanded hydrogen, for example in a column provided with plates or with small metal tubes of the type sometimes termed "Raschig rings". Under the influence of this stream of liquid nitrogen the carbon-monoxide and the methane remaining in the gaseous mixture, being less volatile than the nitrogen, are condensed and replaced by gaseous nitrogen, the presence of which latter is not undesirable if the hydrogen is intended for use in the manufacture of synthetic ammonia. In addition to this nitrogen which is introduced into the hydrogen in the manner just described, there is also to be taken into account that which may be present in the hydrogen leaving the tubes F. In this last method of completing the purification, the quantity of liquid nitrogen should be sufficient to ensure that, after cooling the hydrogen to the very low temperature of the nitrogen boiling under reduced pressure and after condensation of the carbon-monoxide and methane, there is still an excess of nitrogen in the washing liquid when it leaves the column; this liquid is then added to the liquid carbon-monoxide discharged into the principal column of the apparatus.

Figure 2:
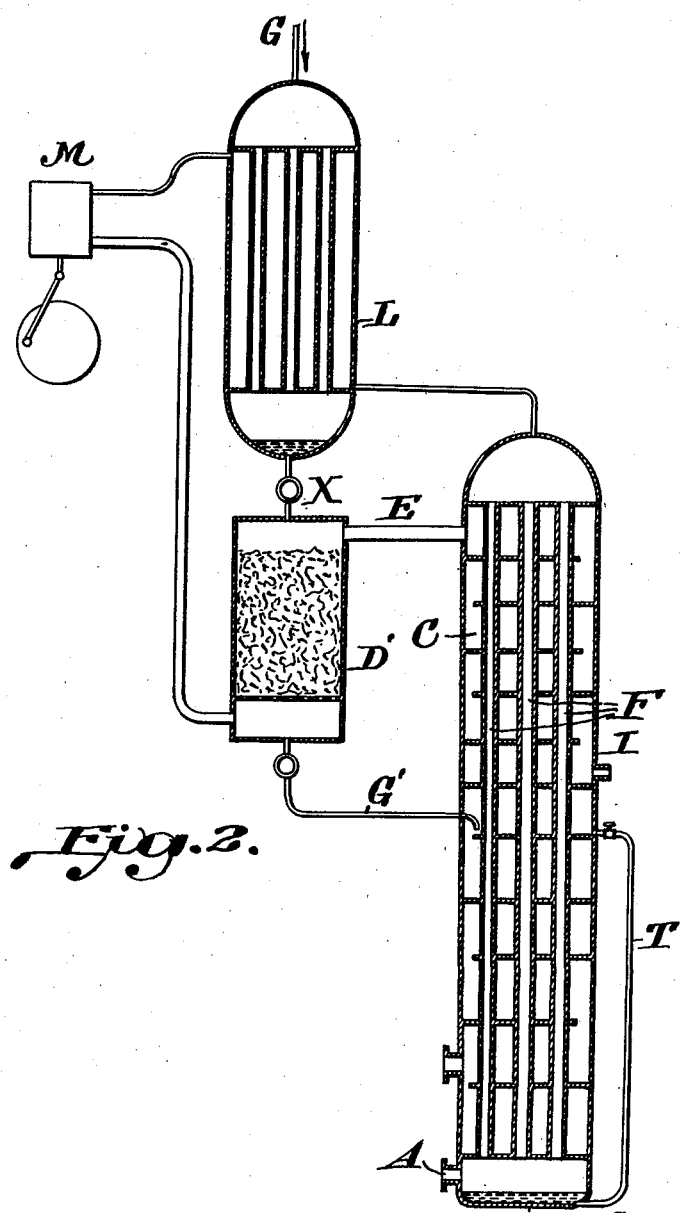

Fig. 2 represents an apparatus for carrying the process thus completed. The compressed and cold gaseous mixture containing, for instance, hydrogen together with carbon-monoxide and nitrogen arrives at A and ascends the tubes F wherein it partly liquefies. A mixture of liquid nitrogen and carbon-monoxide collects at B and is discharged through pipe T to the outside of the lower part of the tube bundle to be vaporized in the chamber external to said bundle. The gas obtained at the upper part of tubes F passes, in the same way as in Fig. 1, through liquefier L and then through expansion engine M; whereafter it is delivered to the lower part of a rectification column D' filled with Raschig rings that takes the place of the collector D of Fig. 1, at the upper part of which column is delivered through valve X nitrogen which has been liquefied in liquefier L. The cold gaseous mixture thus produced is delivered through pipe E to the chamber C around the upper part of the tube bundle F and leaves through outlet I. The excess liquid arriving at the lower part of column D' of delivered by pipe G' to the chamber C outside of the tubes F.

It will be noted that the calorific capacity of the hydrogen which leaves the tubes F is increased by the whole calorific capacity of the liquid which is introduced into the column D', the addition of the said liquid producing the effect that the mass of gas circulating outside the tubes F of the liquefaction system is greater than if the hydrogen alone were to circulate outside the said tubes. The calorific capacity of the gases circulating outside the tubes F can thus be made equal to or greater than that of the gaseous mixture circulating in the opposite direction inside the said tubes whereby the efficiency of the condensation is improved.

If the gaseous mixture treated itself contains nitrogen, it, or the portion thereof required for carrying out the present process, may be extracted from the said gaseous mixture—by any of the usual means. In general this nitrogen is mixed with more easily liquefiable gases, such as methane and carbon-monoxide. Hence during the course of the partial and progressive liquefaction of the gaseous mixture, there is first collected principally methane, and then a mixture of nitrogen and carbon-monoxide which is separated by rectification; this rectification is preferably carried out with the known means of progressive auto-purification in nitrogen, the nitrogen necessary for the process being derived from that point in the auto-purification cycle where it is present in a compressed and cold condition.

Figure 3:
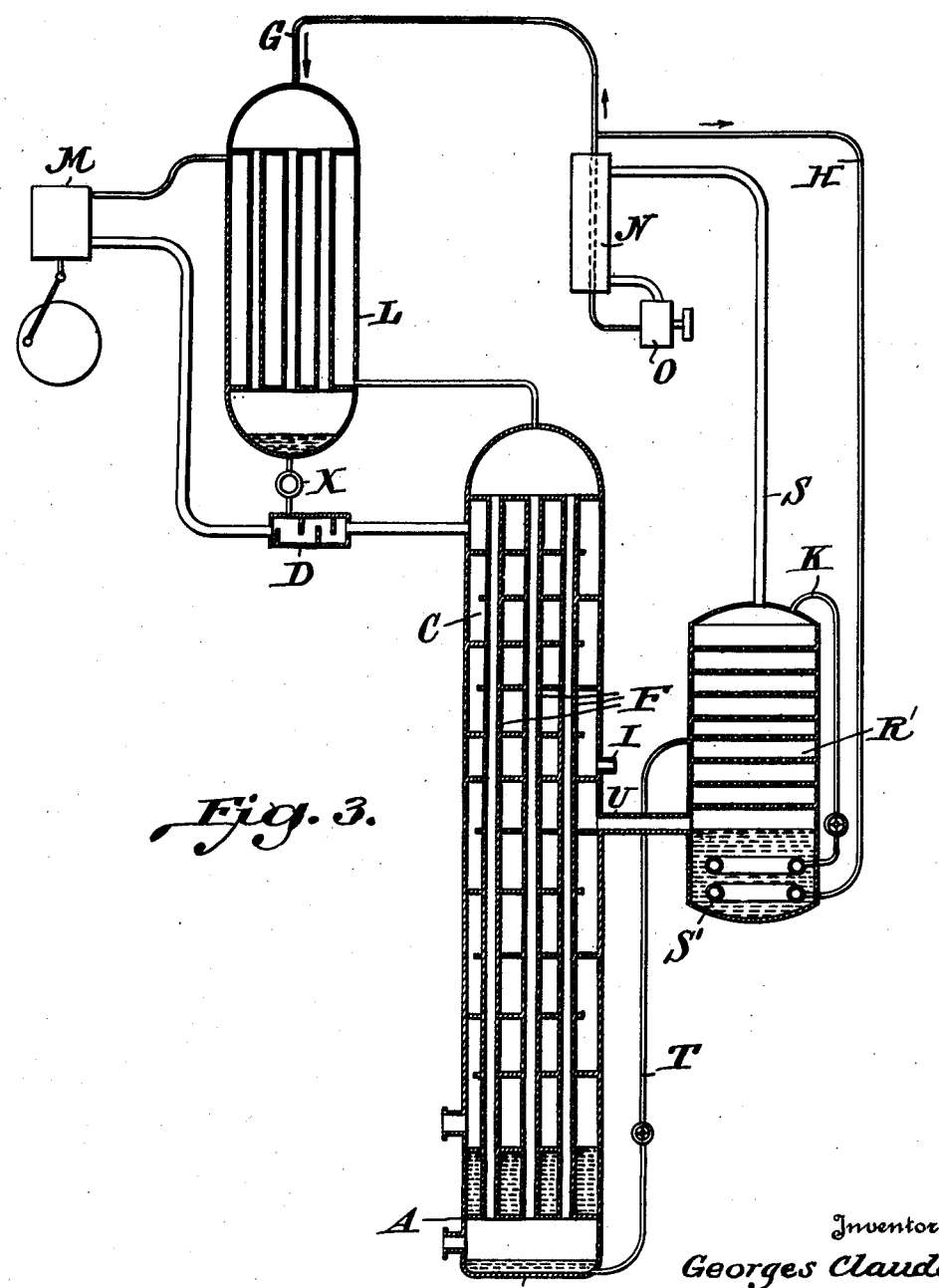

Fig. 3 represents an apparatus for carrying out the modified process which has just been described. The compressed cold gaseous mixture containing hydrogen together with nitrogen and carbon-monoxide arrives at A similarly to Fig. 2 and partly liquefies inside bundle F; but here the liquid nitrogen and carbon-monoxide collected at B is discharged through pipe T to the inside of a rectification column R'. The upper part of this column is connected through pipe S to a compressor O by way of a temperature exchanger N, and the gas from the upper part of column R' sucked in by compressor O is discharged into exchanger N where it becomes cold. A part of this cold gas is delivered through inlet G to liquefier L, while the other part is delivered through pipe H to coil S' at the lower part of column R'; the liquid resulting from this liquefaction in coil S' is discharged through pipe K at the upper part of column R'.

The working of the column R' together with compressor O gives in the known way a gas relatively rich in nitrogen which escapes through pipe S and a part of which, in a compressed state, is then liquefied in liquefier L; the other part passing through pipe H is liquefied in coil S' and delivered to the upper part of column R'. The liquid outside coil S' is composed for the greater part of carbon-monoxide which is vaporized, and the excess of the gas and of the liquid is delivered through pipe U to the chamber around bundle F.

It is also to be noted that, in the case of coke oven gas, this latter does not generally contain sufficient nitrogen for the production of synthetic ammonia without recourse being had to nitrogen from an external source. This however may be avoided by increasing the proportion of nitrogen in the gases to the extent necessary to obtain the above result, this being effected by admitting to the carbonization apparatus air in regulated amounts, the admission of air being preferably to those parts of the charge in the retort which are situated furthest from the gas outlet. By means of such treatment the further advantage is secured that the heat which is disengaged is of considerable assistance in carrying out the distillation whereby the consumption of heating gas is reduced. The gases of combustion, for example those circulating around the retorts, could also be admitted into the retorts, if desired, in regulated quantities so as to increase the proportion of nitrogen in the coke oven gas produced to the requisite extent.

Lastly in the case where the hydrogen produced is intended for use in the manufacture of synthetic amonia, it has been found that the liquid nitrogen (which is introduced into and allowed to vaporize in the expanded hydrogen) can be replaced by liquid air, especially if the quantity of liquid introduced is small, a sufficient effect in actual practice as regards the purification of the hydrogen being still obtained despite this replacement, When using this method however of purifying the hydrogen it is necessary, before passing the reaction mixture of hydrogen and nitrogen into the synthesis apparatus proper, to pass it through a purifying apparatus in which the oxygen and any oxygen compounds that may be present are eliminated by reaction with the hydrogen contained in the gaseous mixture in the presence of a catalyst.

We claim as our invention:

1. A process for the separating of hydrogen from gaseous mixtures containing the same, which comprises the steps of liquefying practically all the constituents of the gaseous mixture excepting hydrogen, expanding all the residual hydrogen, introducing and vaporizing liquid nitrogen which has been liquefied outside of the separation process proper in said expanded hydrogen after its expansion to lower the temperature thereof, and circulating the resulting mixture in indirect contact with the hydrogen-containing mixture to be purified.

2. In a process for the separation of hydrogen by partial liquefaction of gaseous mixtures containing the same, the steps of expanding the hydrogen, introducing liquid nitrogen into the hydrogen and allowing it to vaporize therein so as to lower the temperature, and thereafter circulating the very cold mixture thus obtained around the tube system in which the final condensation of the gases accompanying the hydrogen is effected under pressure.

3. A method for the separation of gaseous mixtures, which comprises partially liquefying the compressed gaseous mixture, expanding the whole separated gaseous product, introducing into said expanded gaseous product a liquefied gas which vaporizes in said gaseous product and thereby lowers the temperature of the mixture, and using the cold mixture thus obtained for the final purification by liquefaction of the compressed gaseous mixture.

4. A method for the separation of gaseous mixtures, which comprises partially liquefying the compressed gaseous mixture, and purifying the compressed gaseous product thus separated by liquefaction in indirect contact with a cold mixture obtained by introducing into a gas another liquefied gas which vaporizes therein and thereby lowers the temperature.

5. A method for the separation of gaseous mixtures, which comprises partially liquefying the compressed gaseous mixture, purifying the separated gaseous product, reheating it, expanding it, introducing into said expanded gaseous product a liquefied gas which vaporizes in said gaseous product and thereby lowers the temperature of the mixture, and using the cold mixture thus obtained for the final purification by liquefaction of the compressed gaseous mixture.

6. A method for the separation of gaseous mixtures, which comprises partially liquefying the compressed gaseous mixture, purifying the separated gaseous product, reheating it by cooling and liquefying a gas, expanding it, introducing into the expanded gaseous product the aforesaid liquefied gas which vaporizes in said gaseous product and thereby lowers the temperature of the mixture, and using the cold mixture thus obtained for the final purification by liquefaction of the compressed gaseous mixture.

7. A method for the separation of gaseous mixtures, which comprises partially liquefying the compressed gaseous mixture, collecting and rectifying a liquid component of the mixture, expanding the whole separated gaseous product, introducing into the expanded gaseous product the above liquefied component which vaporizes in said gaseous product and thereby lowers the temperature of the mixture, and using the cold mixture thus obtained for the final purification by liquefaction of the compressed gaseous mixture.

8. In a process for the separation of hydrogen by partial liquefaction of gaseous mixtures containing the same, the steps of cooling and liquefying nitrogen by the cold of the gas rich in hydrogen resulting from the partial liquefaction, introducing and vaporizing this liquid nitrogen in the said gas rich in hydrogen to lower the temperature thereof, and circulating such gas in indirect contact with the hydrogen-containing mixture to be purified.

9. A process for the separation of gases liquefying at low temperature, which comprises the steps of liquefying practically all the consituents of the gaseous mixture excepting the gas which liquefies at the lowest temperature, expanding all of said residual gas, introducing and vaporizing a liquefied gas which has been liquefied outside of the separation process proper in said expanded residual gas after its expansion to lower the temperature thereof, and circulating the resulting gas in indirect contact wih the gaseous mixture being liquefied.

10. A method for the separation of gaseous mixtures, which comprises partially liquefying the compressed gaseous mixture, collecting a liquid containing substantially two constituents of the gaseous mixture, introducing said liquid into a cycle of liquefaction and rectification with progressive purification of the most volatile element, taking from this cycle part of this last element in a compressed and cold state, liquefying it by the gas remaining after the above partial liquefaction, expanding said gas, introducing into said expanded gas the above liquefied part of the most volatile element which vaporizes in said gas and thereby lowers the temperature of the mixture, and using the cold mixture thus obtained for the final purification by liquefaction of the compressed gaseous mixture.

In testimony whereof, we affix our signatures.

GEORGES CLAUDE.
JEAN LE ROUGE.